(12) United States Patent
Stettler, Jr. et al.

(10) Patent No.: US 7,993,230 B2
(45) Date of Patent: Aug. 9, 2011

(54) DUAL PATH HYDROMECHANICAL POWERTRAIN

(75) Inventors: Werner Stettler, Jr., Cedar Falls, IA (US); Douglas Rene Johnson, Waterloo, IA (US)

(73) Assignee: Deere & Company, Moline, IL (US)

( * ) Notice: Subject to any disclaimer, the term of this patent is extended or adjusted under 35 U.S.C. 154(b) by 685 days.

(21) Appl. No.: 12/115,619

(22) Filed: May 6, 2008

(65) Prior Publication Data

US 2009/0280943 A1 Nov. 12, 2009

(51) Int. Cl.
*F16H 47/04* (2006.01)
*B60K 17/10* (2006.01)
*B60K 17/06* (2006.01)

(52) U.S. Cl. ............ 475/83; 475/72; 475/74; 180/367; 180/369

(58) Field of Classification Search ............ 475/72–83; 180/364, 365, 367, 369
See application file for complete search history.

(56) References Cited

U.S. PATENT DOCUMENTS

| | | | | |
|---|---|---|---|---|
| 3,411,381 A | * | 11/1968 | Orshansky, Jr. | 475/80 |
| 3,455,183 A | * | 7/1969 | Orshansky, Jr. | 475/78 |
| 3,470,769 A | | 10/1969 | Livezey | |
| 3,538,790 A | * | 11/1970 | Polak | 475/24 |
| 3,709,061 A | * | 1/1973 | Orshansky, Jr. | 475/80 |
| 3,869,939 A | * | 3/1975 | Miyao et al. | 475/80 |
| 3,990,327 A | | 11/1976 | Margolin | |
| 4,354,400 A | * | 10/1982 | Baker | 475/74 |
| 5,024,633 A | * | 6/1991 | Schmidt | 475/72 |
| 5,911,645 A | | 6/1999 | Wontner et al. | |
| 6,761,658 B1 | * | 7/2004 | Stettler, Jr. | 475/73 |
| 7,063,638 B2 | * | 6/2006 | Weeramantry | 475/74 |
| 7,121,970 B2 | * | 10/2006 | Funato et al. | 475/78 |
| 7,354,368 B2 | * | 4/2008 | Pollman | 475/72 |
| 7,722,493 B2 | * | 5/2010 | Liebherr et al. | 475/80 |

FOREIGN PATENT DOCUMENTS

| EP | 0 014 122 | 4/1982 |
|---|---|---|
| EP | 0 450 282 | 10/1991 |

OTHER PUBLICATIONS

European Search Report, 4 Pages, Jul. 29, 2009.

* cited by examiner

*Primary Examiner* — Tisha D Lewis

(57) ABSTRACT

A hydromechanical powertrain for a ground vehicle. The powertrain, more specifically a transmission, includes an input shaft that is coupled to a rotational power source and an output shaft that is coupled to a load. A first hydrostatic unit coupled to a first gear, while a second hydrostatic unit is selectively coupled to one of a pair of clutches. The first of the clutches has a first clutch gear that is selectably coupled to a first mode gear, which is in turn rotationally fixed to the output shaft. The second of clutches has a second clutch gear that is selectively coupled to a second mode gear, which is in turn rotationally fixed to the input shaft. Also coupled to the input shaft is a planetary gear set.

8 Claims, 1 Drawing Sheet

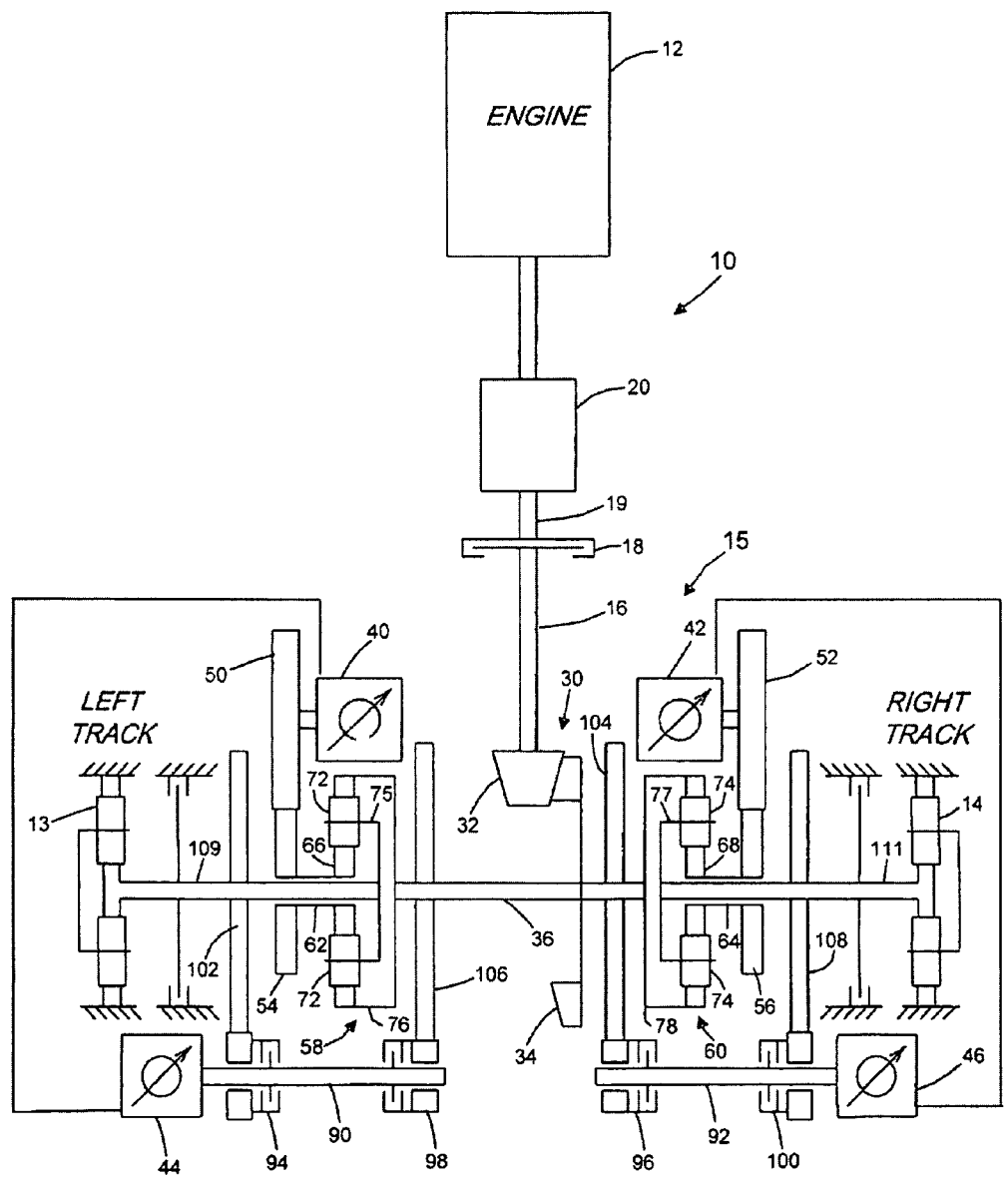

DUAL PATH HYDROMECHANICAL POWERTRAIN

TECHNICAL FIELD

The present invention relates to powertrains and specifically to transmissions for transferring power from the engine to ground engaging wheels or tracks.

BACKGROUND OF THE INVENTION

Ground vehicles such as agricultural tractors and road vehicles are typically equipped with transmissions for transferring power from the engine to the ground. Conventional transmissions provide different gear ratios between the engine and the wheels or tracks of the vehicle to match the various operating conditions. In the past, this has been done with discrete gear ratios. The gear ratios are selected generally manually as for example, in conventional manual transmissions or operator control power shifted transmissions. However, these conventional transmissions have drawbacks in that there are only a limited number of discrete ratios available and the available gear ratios are not always optimal for the particular operating conditions.

Thus, a more flexible system that has been developed is the stepless or infinitely variable transmissions. One particular type of variable transmission is the hydrostatic drive. These transmissions are used commonly in self-propelled combines and lawn tractors. Another type of transmission is an electric drive such as the ones used in railway locomotives and some earth moving equipment. However, both of these transmissions have cost and efficiency disadvantages. Another type of transmission is a hydromechanical transmission. These transmissions have also been used in agricultural tractors, for example, in the tractors sold by Fent of Germany, Klass of Germany and Steyr of Austria. Hydromechanical transmissions have an advantage over hydrostatic drives in that part of the power is transmitted mechanically resulting in better efficiency than pure hydrostatic drives. While the above-mentioned hydromechanical transmissions achieve their intended purpose, there are significant disadvantages. For example, the transmission provided by Fent is a two-range transmission that must be at a stand still to shift between low and high range. The transmission offered by Klass is an eight mode transmission and is rather complex. The Steyr transmission is a four mode version, however, it has a mode shift at a commonly used working range and the efficiency at this point is not optimal.

In vehicles having tracks, there is an additional problem. These track vehicles are steered by providing a differential speed between the two tracks. Track tractors are steered with a clutch and brake for each track. The clutch for one track is released and if necessary, the brake for that track is applied. This slows that track and, thus, the tractor turns. Alternatively, a differential steer is provided using a separate hydraulic pump and motor for the steering. However, the forward steer is still controlled by the transmission with discrete steps. Also, a dual path hydrostatic transmission may be used for track vehicles. Thus, both forward travel and steering are infinitely variable. However, these advantages come at a cost of reduced efficiency.

Therefore, a new and improved hydromechanical transmission is desirable. The new and improved transmission should be infinitely variable.

BRIEF SUMMARY OF THE INVENTION

In overcoming the above drawbacks, and other limitations of the known technology, the present invention provides a hydromechanical transmission for a ground vehicle, in particular a tractor.

In one aspect, the present invention provides for a transmission having an input shaft that is coupled to a rotational power source and an output shaft that is coupled to a load. A first hydrostatic unit coupled to a first gear and a second hydrostatic unit is selectively coupled to one of a first and a second clutch. Each of the first and second clutches has a respective first and second clutch gear. A first mode gear is selectively coupled to the first clutch gear and is rotationally fixed to the output shaft. A second mode gear selectively coupled to the second clutch gear and is rotationally fixed to the input shaft. Finally, the ring gear of a planetary gear set is also coupled to the input shaft. An example of a load to which the output may be connected is the track of a tractor.

In another aspect, the present invention includes a bevel gear that transmits rotary motion from the rotational power source to the input shaft.

In a further aspect of the invention, a clutch is disposed between the rotational power source and the input shaft so as to enable disengagement of the rotational power source from the input shaft.

In one aspect, the mode gears may be spur gears.

In another aspect of the invention, a gearbox is provided for transmitting rotary motion from the rotational power source to an auxiliary unit.

In still a further aspect, a brake is fixed to the output shaft and selectively couple to a stationary member of the vehicle.

In yet another aspect, the invention may include a third hydrostatic unit coupled to a third gear.

In another aspect of the invention, a powertrain for a ground vehicle is provided in which an engine provides a rotational power to an input shaft and an output shaft provides the rotational power to a load. Coupled to be driven by the input shaft is the ring gear of a planetary gear set. A first pair of hydrostatic units are coupled to a first pair of gears and a second pair of hydrostatic units are selectively coupled to one of a first pair and a second pair of clutches. The first pair of clutches has a first clutch gear and second pair of clutches has a second clutch gear. A first mode gear, which is rotationally fixed to the output shaft, can be selectively coupled to the first clutch gear. A second mode gear can be selectively coupled to the second clutch gear and is rotationally fixed to the input shaft.

In a further aspect, the invention includes a bevel gear for transmitting rotary motion from the rotational power source to the input shaft.

In still another aspect of the invention, a clutch disposed between the rotational power source and the input shaft. The clutch allows for disengagement of the rotational power source from the input shaft.

In yet another aspect, the invention includes a gearbox that transmits rotary motion from the rotational power source to an auxiliary unit.

In a further aspect of the invention, a brake is fixed to the output shaft and selectively coupled to a stationary member of the ground vehicle.

An additional aspect of the invention is that it may also include a third hydrostatic unit coupled to a third gear.

An additional aspect of the invention is that it may also include a third hydrostatic unit coupled to a third gear.

These and other aspects and advantages of the present invention will become apparent upon reading the following detailed description of the invention in combination with the accompanying drawings.

BRIEF DESCRIPTION OF THE DRAWINGS

FIG. 1 is a schematic diagram of the powertrain including an engine and a transmission having a dual path hydromechanical drive, in accordance with an embodiment incorporating the principles of the present invention.

DETAILED DESCRIPTION OF THE INVENTION

Referring now to FIG. 1, a powertrain 10 for transferring power from an engine 12 to wheels or tracks 13, 14 of a vehicle is schematically illustrated, in accordance with an embodiment of the present invention. Powertrain 10 includes engine 12 and a transmission 15. Transmission 15 is configured to transmit torque developed in engine 12 to wheels or tracks of a road vehicle. Generally, transmission 15 is coupled to engine 12 through a driveshaft 16. In an embodiment of the present invention a clutch 18 is provided to selectively engage or disengage an output shaft 19 from driveshaft 16. A drive 20 for a power take off, charge pump and vehicle hydraulics pump, may optionally be provided to couple the output shaft 19 to one of such devices.

Transmission 15 receives input torque from driveshaft 16. More specifically, driveshaft 16 is rotationally fixed to a spiral bevel gear set 30. Spiral bevel gear set 30 includes a bevel gear 32 in meshed relationship with beveled ring gear 34. Thus, torque from engine 12 is transmitted through driveshaft 16 to bevel gear 32 through to bevel ring gear 34. Bevel ring gear 34 is fixedly coupled to transmission input driveshaft 36.

Transmission 15 includes four hydrostatic units 40, 42, 44 and 46. Hydrostatic units 40, 42, 44 and 46 are preferably variable displacement hydrostatic units. Generally, hydrostatic units 40-46 include an electric motor in communication with a variable displacement hydraulic pump. Hydrostatic units 40 and 42 will herein be referred to as sun units (SU) and hydrostatic units 44 and 46 will herein be referred to as clutched units (CU).

Sun units 40 and 42 are coupled to spur gears 50 and 52. Spur gears 50 and 52 have gear teeth that mesh with the gear teeth on sun gears 54, 56. Sun gears 54, 56 are respectively coupled to secondary sun gears 66 and 68 through a sun gear driveshafts 62 and 64. Secondary sun gears 66 and 68 of planetary gear sets 58 and 60 have a plurality of gear teeth that mesh with the gear teeth of planetary gears 72 and 74. Planetary gears 72 and 74 are rotatably fixed to planetary gear carriers 75, 77. Planetary gear carriers 75, 77 are stationary. The gear teeth of planetary gears 72 and 74 rotationally mesh with the gear teeth of ring gears 76 and 78. Ring gears 76 and 78 are fixed for rotational movement with transmission input driveshaft 36.

Clutched units 44 and 46 have a clutch shaft 90 and 92 that is configured to engage or disengage clutches 94, 96, 98 and 100. Clutches 94 and 100 will be referred to herein as the mode 1 clutches and clutches 96 and 98 will be referred to herein as the mode 2 clutches. A pair of mode 1 spur gears 102 and 108 are in meshed teeth relationship with mode 1 spur gears and clutches 94 and 100. In meshed teeth relationship with spur gear and clutches 96 and 98 are mode 2 spur gears 104 and 106. Mode 2 spur gears 104 and 106 are fixedly coupled to input driveshaft 36. Mode 1 spur gears 102 and 108 are rotationally coupled to output driveshafts 109 and 111, respectively.

Transmission 15 includes at least two operating modes, herein designated as mode 1 and mode 2. Transmission 15 is placed into mode 1 by engaging the mode 1 clutches 94, 100. When the mode 1 clutches 94, 100 are engaged, clutched units 44 and 46 are geared to output shafts 109, 111. At zero output speed of shaft 36, CU's 44 and 46 are at maximum displacement and at zero speed. Further, at zero speed, the SU units 40 and 42 are at zero displacement, but at relatively high speed as they are being driven by sun gears 54 and 56. In order to start rotating output shafts 109, 111 at a given speed, the displacement of the SU units 40 and 42 is increased. As the displacement of the SU units is increased, hydraulic fluid is pumped to the CU units 44 and 46. The hydraulic fluid pumped from the SU units 40 and 42 causes the CU units 44 and 46 to rotate and thereby cause the output shafts 109, 111 to rotate. As the displacement of the SU units 40 and 42 is increased, speed of the output shafts 109, 111 is increased. After the displacement of the SU reaches its maximum displacements, the displacement of CU units 44 and 46 is decreased further increasing the speed of the output shafts 109, 111. When the displacement of the CU units 44 and 46 reach zero, the maximum speed of mode 1 is reached. When the displacement of CU units 44 and 46 is zero, flow of hydraulic fluid to the SU units 40 and 42 is stopped, thus preventing them from rotating. Thus, apart from parasitic losses of the hydraulic fluid, the power is transmitted entirely mechanically. At the shift point, the torque on the CU units 44 and 46 are nominally zero. By choosing the proper gear ratios, the mode 2 clutches will have both elements rotating at the same speed. Thus, synchronous shift is provided. Since the mode 1 to mode 2 shift is synchronous and zero torque is present, the clutches can be either conventional clutches with friction disks or collar or dog clutches of the type more commonly used in manual transmissions. Reverse is obtained by increasing displacement of the SU units 40 and 42 in the opposite direction of that used for forwarding mode 1.

In operation, mode 2 is achieved by disengaging the mode 1 clutches 94 and 100 and engaging the mode 2 clutches 96 and 98. In mode 2, the CU units 44 and 46 are effectively geared to the input such that its speed remains a constant ratio to the input. To increase the output shaft speed 36, the displacement of CU units 44 and 46 is increased in a direction opposite of mode 1. The displacement of CU units 44 and 46 continues to be increased to approximately 30% of its maximum. The displacement of SU units 40 and 42 is then decreased to approximately 50% of its maximum. This condition is the maximum output speed of the transmission 15. Thus, transmission 15 can be ratioed from zero to a maximum smoothly without interrupting the power flow. Reverse is not available in mode 2.

The foregoing disclosure is the best mode devised by the inventor for practicing this invention. It is apparent, however, that methods and systems incorporating modifications and variations will be obvious to one skilled in the art of hydromechanical transmissions thereof. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

The invention claimed is:

1. A vehicle powertrain for a ground vehicle, the powertrain comprising:
   an engine for providing a rotational power;
   an input shaft coupled to the engine for receiving the rotational power;
   an output shaft coupled to a load;

a first pair of hydrostatic units coupled to a first pair of gears;

a second pair of hydrostatic units selectively coupled to one of a first pair and a second pair of clutches, wherein the first pair of clutches has a first clutch gear and second clutch has a second clutch gear;

a first mode gear selectively coupled to the first clutch gear and rotationally fixed to the output shaft;

a second mode gear selectively coupled to the second clutch gear and rotationally fixed to the input shaft; and a planetary gear set having a sun gear engaged with a plurality of planetary gears, wherein the planetary gears are rotatably coupled to a planetary gear carrier and wherein the planetary gears are engaged with a ring gear that is coupled to the input shaft.

2. The vehicle powertrain of claim 1 further comprising a bevel gear for transmitting rotary motion from engine to the input shaft.

3. The vehicle powertrain of claim 1 further comprising a clutch disposed between the engine and the input shaft for disengaging the engine from the input shaft.

4. The vehicle powertrain of claim 1 further comprising a gearbox for transmitting rotary motion from the engine to an auxiliary unit.

5. The vehicle powertrain of claim 1 wherein the load is a track of a tractor.

6. The vehicle powertrain of claim 1 further comprising a brake fixed to the output shaft and selectively couple to a stationary member of the ground vehicle.

7. The vehicle powertrain of claim 1 further comprising a third hydrostatic unit coupled to a third gear.

8. The vehicle powertrain of claim 1 wherein the first and second mode gears are spur gears.

* * * * *